United States Patent
Shinozaki et al.

(10) Patent No.: US 12,202,767 B2
(45) Date of Patent: Jan. 21, 2025

(54) GLASS AND METHOD FOR MANUFACTURING THE SAME

(71) Applicant: NATIONAL INSTITUTE OF ADVANCED INDUSTRIAL SCIENCE AND TECHNOLOGY, Tokyo (JP)

(72) Inventors: Kenji Shinozaki, Ikeda (JP); Tomoko Akai, Ikeda (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 403 days.

(21) Appl. No.: 17/637,920

(22) PCT Filed: Sep. 18, 2020

(86) PCT No.: PCT/JP2020/035448
§ 371 (c)(1),
(2) Date: Feb. 24, 2022

(87) PCT Pub. No.: WO2021/065562
PCT Pub. Date: Apr. 8, 2021

(65) Prior Publication Data
US 2022/0289618 A1    Sep. 15, 2022

(30) Foreign Application Priority Data
Sep. 30, 2019  (JP) .................................. 2019-179759

(51) Int. Cl.
B32B 15/04      (2006.01)
B32B 17/06      (2006.01)
(Continued)

(52) U.S. Cl.
CPC ................ C03C 3/089 (2013.01); C03B 1/00 (2013.01); C03B 5/235 (2013.01); C03C 1/06 (2013.01);
(Continued)

(58) Field of Classification Search
CPC ....................................................... C03C 4/00
(Continued)

(56) References Cited

U.S. PATENT DOCUMENTS 5,258,335 A    11/1993  Muralidhar et al.
2015/0111030 A1*  4/2015  Miyasaka ............. C03C 23/007
                                                                428/338

FOREIGN PATENT DOCUMENTS

EP          0423752 A2      4/1991
JP          02-092841 A     4/1990
(Continued)

OTHER PUBLICATIONS

JP H02-92841 A (Kimura) Apr. 3, 1990 (English language machine translation). [online] [retrieved Jun. 19, 2024]. Retrieved from: Espacenet. (Year: 1990).*
(Continued)

*Primary Examiner* — Lauren R Colgan
(74) *Attorney, Agent, or Firm* — HAUPTMAN HAM, LLP

(57) ABSTRACT

A glass includes a first glass portion and a second glass portion. The first glass portion has a higher ion packing density than the second glass portion (has a composition that forms a glass in which, out of plastic deformation characteristics, plastic flow is dominant). The second glass has a lower ion packing density than the first glass portion (has a composition that forms a glass in which, out of the plastic deformation characteristics, densification is dominant).

20 Claims, 8 Drawing Sheets

(51) Int. Cl.
- *C03B 1/00* (2006.01)
- *C03B 5/235* (2006.01)
- *C03C 1/06* (2006.01)
- *C03C 3/089* (2006.01)
- *C03C 4/00* (2006.01)
- *C03C 4/08* (2006.01)

(52) U.S. Cl.
CPC ................ *C03C 4/00* (2013.01); *C03C 4/082* (2013.01); *C03B 2201/34* (2013.01); *C03B 2201/40* (2013.01); *C03C 2204/00* (2013.01)

(58) Field of Classification Search
USPC .......................................................... 428/428
See application file for complete search history.

(56) References Cited

FOREIGN PATENT DOCUMENTS

| JP | H06-97566 B2 | 11/1994 |
|---|---|---|
| JP | 2008-308400 A | 12/2008 |
| JP | 2009-227570 A | 10/2009 |
| JP | 2017-071545 A | 4/2017 |
| JP | 2018-104285 A | 7/2018 |
| WO | 2013-161791 A1 | 10/2013 |

OTHER PUBLICATIONS

Wondraczek et al, Lothar, "Towards Ultrastrong Glasses", Advanced Materials, vol. 23, No. 39, Sep. 8, 2011.

Bernardo et al, E, "Optimisation of sintered glass—ceramics from an industrial waste glass", Ceramics International, Elsevier, Amsterdam, NL, vol. 36, No. 5, Jul. 1, 2010.

Extended European Search Report issued in corresponding European Application No. 20871676.1, dated Dec. 22, 2023, pp. 1-7.

Yamane, Masayuki, et al., editors. Handbook of Glass Engineering. Asakura Publishing Co., Ltd., 1999, pp. 189-194.

International Search Report issued in corresponding International Application No. PCT/JP2020/035448, mailed Nov. 17, 2020, pp. 1-2, Japan Patent Office, Tokyo, Japan.

* cited by examiner

FIG. 1
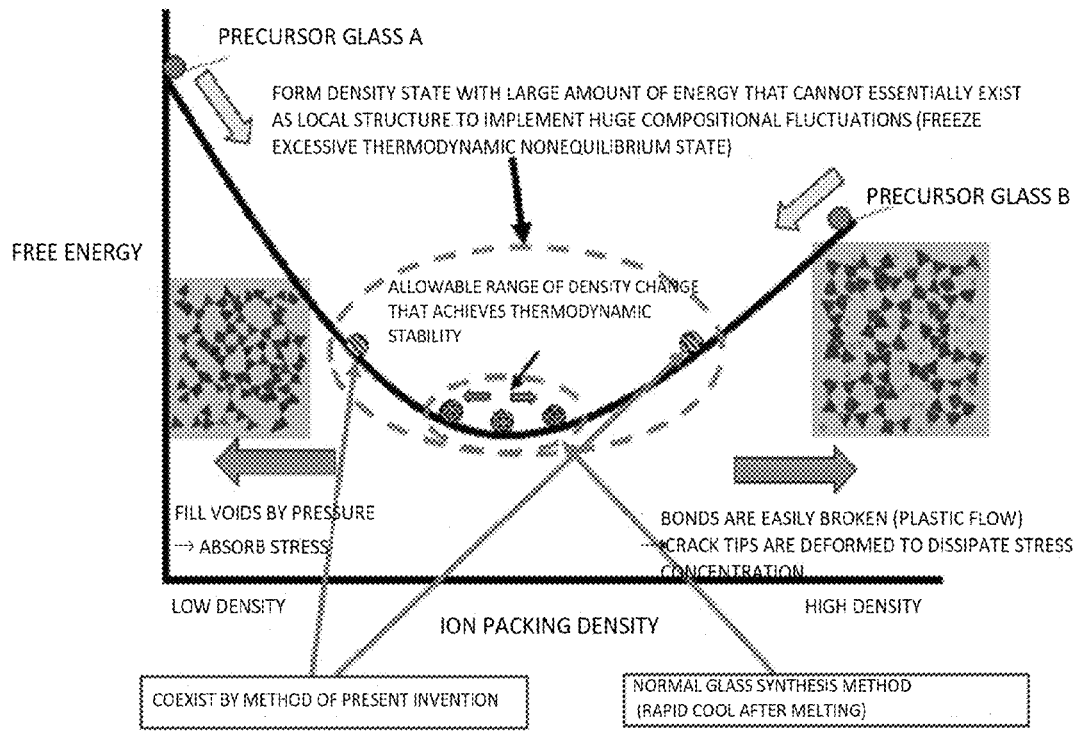
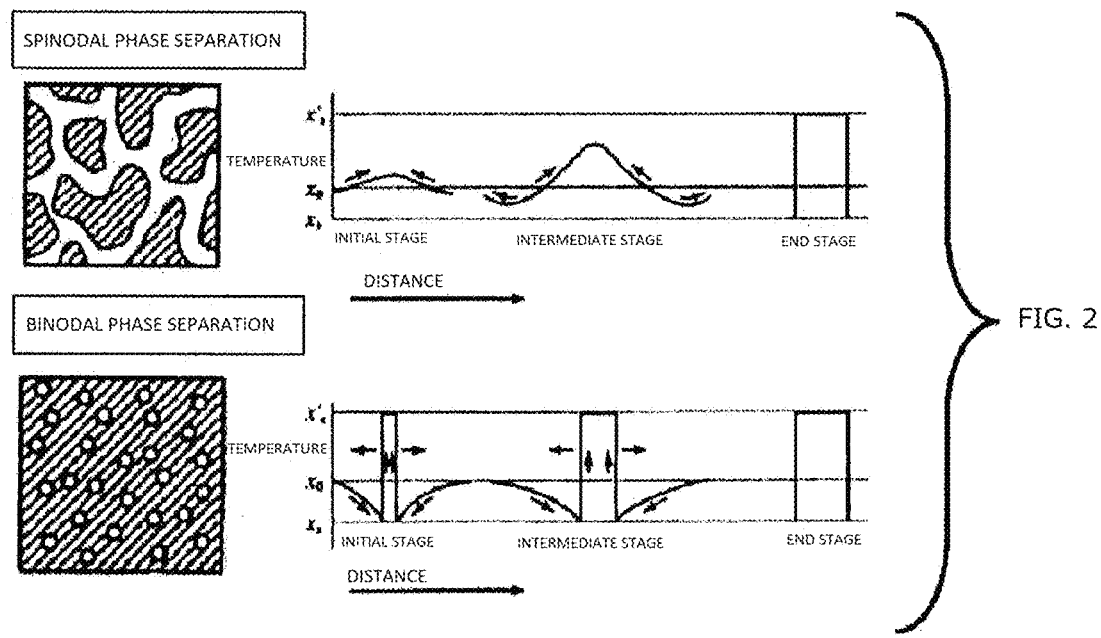
FIG. 2

* Tg1, Tg2: GLASS TRANSITION TEMPERATURES OF FIRST GLASS AND SECOND GLASS

SiO2:24Na2O_12MgO_6CaO_6Al2O3_48B2O3_4CuO=5:5

TWO SiO2 PARTICLE SIZES: NANO AND MICRO

EACH HEATED AT 16 kW FOR ONE MIN

GLASS AND METHOD FOR MANUFACTURING THE SAME

CROSS-REFERENCE TO RELATED APPLICATIONS

The present application is a National Phase of International Application Number PCT/JP2020/035448, filed Sep. 18, 2020, which claims priority to Japanese Patent Application No. 2019-179759, filed Sep. 30, 2019.

TECHNICAL FIELD

The present invention relates to glass, and more particularly to glass that is hard to break.

BACKGROUND ART

Glass is widely used for, for example, smartphone covers, windows, displays, tableware, and device sealing, but cracking due to its brittleness is a problem in all applications.

A physical tempering method such as tempering by air jets, a chemical tempering method as disclosed in Japanese Unexamined Patent Publication No. 2018-104285 (Patent Literature 1), and a crystallization method as disclosed in Japanese Unexamined Patent Publication No. 2017-071545 (Patent Literature 2) have been proposed as tempering methods that make glass hard to break.

In the tempering by air jets, glass is air cooled after heated to near the softening point, so that compressive stress remains at the glass surface. In the chemical tempering method, for example, glass is immersed in molten salt to exchange sodium ions with potassium ions, thereby forming a compressive stress layer at the glass surface. In the crystallization method, crystals or metals are precipitated in glass to form a composite, thereby achieving high strength.

CITATION LIST

Patent Literatures

Patent Literature 1: Japanese Unexamined Patent Publication No. 2018-104285
Patent Literature 2: Japanese Unexamined Patent Publication No. 2017-071545

Non-Patent Literatures

Non-Patent Literature 1: Handbook of Glass Engineering, edited by Masayuki Yamane, Asakura Publishing Co., Ltd., ISBN-10: 4254252382, pp. 189-194 (published on Jul. 1, 1999)

SUMMARY OF INVENTION

Technical Problem

In the physical and chemical tempering methods, a residual compressive stress layer is formed near the glass surface to cancel out opening stress that spreads cracks, thereby making glass hard to break. In these tempering methods, however, tensile stress also remains in glass. Accordingly, once a crack reaches a residual tensile stress layer, the glass spontaneously breaks due to the tensile stress. Since the tensile stress remains in glass, it is also difficult to process the glass after tempering. Moreover, it is difficult to control uniform stress distribution in a process of fusing glass to be used in applications such as sealing glass.

In the crystallization method, glass is tempered by forming a glass-crystal or glass-metal composite. It is therefore difficult to obtain transparent glass with high strength. Moreover, the process is complicated because glass is crystallized by reheating. Furthermore, when glass is bonded with a different material, this material may deteriorate due to reheating.

The present invention was made to solve the above problems, and it is an object of the present invention to obtain glass that is hard to break by causing glass portions having different deformation behavior characteristics to coexist.

Solution to Problem

A glass according to the present invention includes a first glass portion and a second glass portion. The first glass portion has a property that, out of plastic deformation characteristics, plastic flow is more dominant than in the second glass portion, and the second glass portion has a property that, out of the plastic deformation characteristics, densification is more dominant than in the first glass portion.

The glass portions need not necessarily be present in an entire bulk, but may be present only near a surface.

Preferably, there is no clear boundary between the first glass portion and the second glass portion, and a change in the property from the first glass portion to the second glass portion is continuous and smooth.

Preferably, the first glass portion or the second glass portion is 1 μm or less in size.

Preferably, in indentation depth measurement using indentation with a Vickers indenter, recovery of indentation depth of a glass having a composition that forms the first glass portion is lower than recovery of indentation depth of a glass having a composition that forms the second glass portion, the recovery of indentation depth RID being given by $(D_b - D_a)/D_b$, where $D_b$ represents an indentation depth before heat treatment at a glass transition temperature, and $D_a$ represents an indentation depth after the heat treatment at the glass transition temperature.

Preferably, the recovery of indentation depth of the glass having the composition that forms the first glass portion is less than 0.35, and the recovery of indentation depth of the glass having the composition that forms the second glass portion is 0.35 or more.

Preferably, an ion packing density of the first glass portion is higher than an ion packing density of the second glass portion.

Preferably, the ion packing density of the first glass portion is 0.55 or more, and the ion packing density of the second glass portion is 0.47 or less.

Preferably, a glass transition temperature of the first glass portion is lower than a glass transition temperature of the second glass portion.

Preferably, the first glass portion includes transition metal ions or rare earth ions and has light absorption by the transition metal ions or the rare earth ions in a near-infrared region.

For example, the above glass is used as a glass sealing member, a glass container, or a glass cover for surfaces of electronic products for consumers.

A method for manufacturing a glass according to the present invention includes the steps of preparing a precursor of a first glass portion in which, of a plastic flow characteristic and a densification characteristic that are plastic deformation characteristics, the plastic flow characteristic is dominant; preparing a precursor of a second glass portion in which the densification characteristic is dominant; mixing the precursor of the first glass portion and the precursor of the second glass portion to obtain a mixture; and heat treating the mixture under a condition that the first and second glass portions remain in the glass.

The above step may not be the step for processing the entire bulk but may be the step for surface treatment.

Preferably, the precursor of the first glass portion has an ion packing density of 0.55 or more, and the precursor of the second glass portion has an ion packing density of 0.47 or less.

Preferably, the precursor of the first glass portion contains 48 mol % or more of $B_2O_3$, and the precursor of the second glass portion contains 80 mol % or more of $SiO_2$.

Preferably, the heat treatment of the mixture is performed under a condition that the first and second portions remain with a continuous change in compositions of the first and second glass portions in the glass after the heat treatment.

Preferably, the precursor of the first glass portion and the precursor of the second glass portion are mixed so that either the precursor of the first glass portion or the precursor of the second glass portion has a particle size of 1 μm or less.

Preferably, the precursor of the first glass portion has a first glass transition temperature, the precursor of the second glass portion has a second glass transition temperature that is higher than the first glass transition temperature, and the mixture is heat treated at a temperature equal to or higher than the first glass transition temperature and equal to or lower than the second glass transition temperature.

Preferably, the mixture is heat treated by infrared radiation.

Advantageous Effects of Invention

According to the present invention, since a portion that dissipates or reduces stress concentration and a portion that absorbs stress exist in the entire glass, glass that is hard to break can be implemented. For example, such glass that is hard to break can be advantageously used for glass sealing members, glass containers, or glass covers for device surfaces.

BRIEF DESCRIPTION OF DRAWINGS

FIG. 1 is a diagram showing the relationship between ion packing density and free energy.

FIG. 2 shows examples of a phase-separated glass.

DESCRIPTION OF EMBODIMENTS

Formation of Heterogeneity

Figure 3:
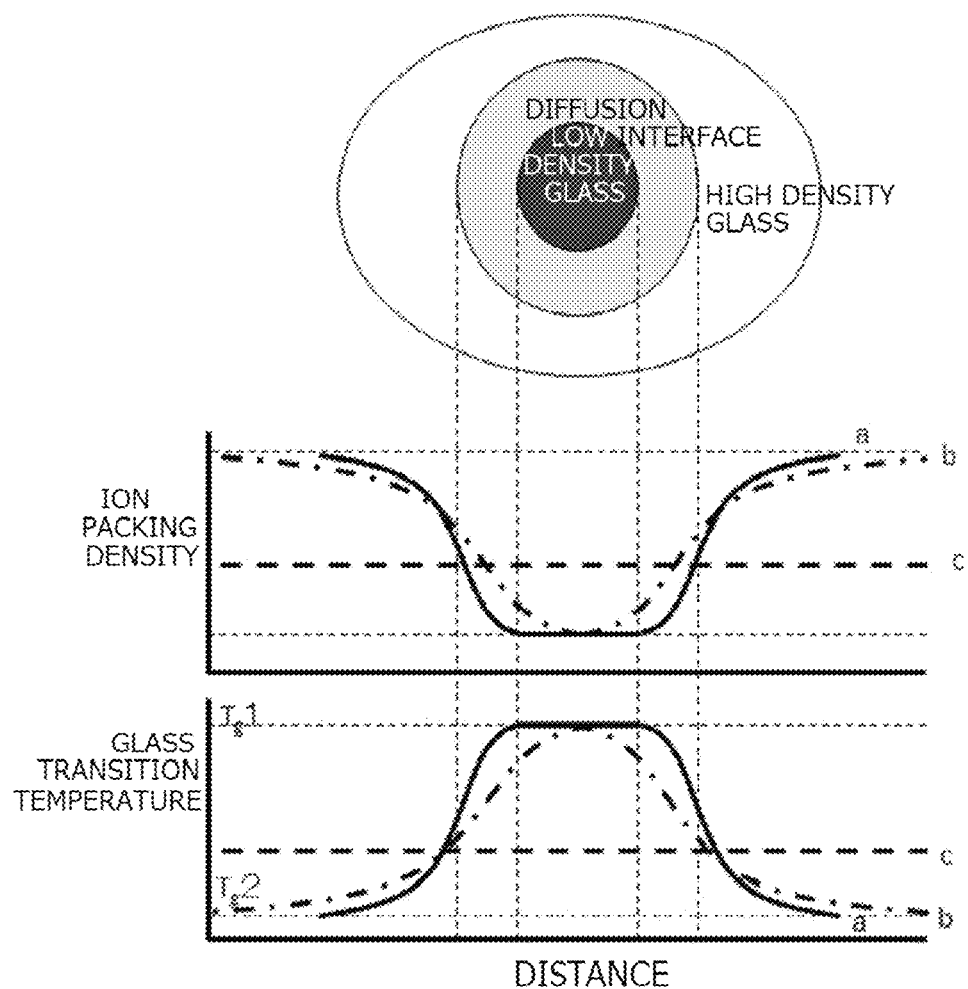
FIG. 3 is an example of a schematic diagram showing that a high density glass portion and a low density glass portion remain in a glass after heat treatment.

In the present invention, glass portions with different compositions and a maximum diameter of about 10 to 1000 nm are dispersed in a glass mother phase.

In order to form heterogeneity, two or more types of glass powders or glass precursors are first prepared and are mixed to obtain mixed powder. The mixed powder is molded and then heat treated. At this time, heat treatment conditions such as heating temperature and time are appropriately adjusted to stop heating in an intermediate stage before the glass composition is homogenized, so that glass portions with a maximum diameter of 10 to 1000 nm remain. This structure need not necessarily exist in the entire bulk. Such a structure may exist only near the surface even if the inside is homogeneous.

In one embodiment of the present invention, when performing the heat treatment to reduce homogenization, the mixed powder is heated by infrared heating such as an infrared lamp heater. However, other heating means may be used. For example, the mixed powder may be heated by various lasers such as a carbon dioxide laser, or may be rapidly heated by a spark plasma sintering device, a microwave heater, etc. Alternatively, the mixed powder may not be rapidly heated, but may be heated at a sufficiently low temperature by a resistance heating furnace etc. In this case, it is difficult to obtain a bulk with no pores when powder is used as a precursor. Accordingly, in one embodiment of the present invention, the mixed powder is heat treated under pressure by a hot press machine or a porous glass prepared in advance is impregnated with a precursor solution of the other glass and vitrified. However, other forms of precursors may be used, or other composite methods or heating methods may be used. A glass container etc. containing the glass of the present invention at least at its surface can be manufactured by these methods.

When a high pressure is applied to glass in contact with a hard object, the glass is subjected to elastic deformation and plastic deformation. Viscoelastic deformation and plastic flow are remarkable depending on the temperature range, but have little contribution at room temperature. When the pressure is removed, the elastically deformed portion recovers almost to its original state, but the plastically deformed portion remains as it is without recovery. This plastically deformed portion can be considered to be composed of the following two types of portions at near room temperature at which viscous flow can be ignored: a plastic flow portion with no volume change, and a densified portion that is a volume change.

In the present invention, a combination of a plurality of glass portions to be prepared needs to include the following two types of glass portions. One glass portion (first glass portion) is a glass portion with a high ion packing density (out of plastic deformation, plastic flow is dominant), and the other glass portion (second glass portion) is a glass portion with a low ion packing density (out of the plastic deformation, densification is dominant). The combination may include three or more types of glass portions in order to control properties such as water resistance and moldability. Properties against local deformation and breakage can be controlled by producing regions with different ion packing densities as desired. For example, important properties related to deformation include Young's modulus, Poisson's ratio, and recovery of indentation depth. However, all of these properties correlate with the packing density. Glass produced by being sufficiently homogeneously melted would exhibit only one physical property. In the present invention, portions with different packing densities are formed, so that a portion that dissipates or reduces stress concentration and a portion that absorbs stress can coexist. Glass that is hard to break is thus implemented.

[Ion Packing Density]

A glass is formed by packing ions of a network former such as $SiO_2$ or $B_2O_3$ and a modifier such as an alkali. Densification of a glass is caused by compression of free space. Accordingly, the densification property is dominant in glass with a low ion packing density and larger voids. On the other hand, the plastid flow property is dominant in glass with a high ion packing density as the volume is less likely to be reduced.

The ion filling density Cg of a glass can be defined by the following expression.

$$Cg = \rho \frac{\sum fi \cdot Vi}{\sum fi \cdot Mi} \quad [\text{Expression 1}]$$

In the expression, ρ represents the density of the glass, fi represents the fraction of a chemical species forming the glass, and Vi represents the volume of the chemical species and is calculated from the ionic radius. $\Sigma fiVi$ means the volume theoretically occupied in space by ions contained in one mole of the glass composition. For calculation of this volume, the Shannon's ionic radius is used, and the volume when the ions are hard spheres is used. Mi is the molar weight of the chemical species, and $\Sigma fiMi$ means the molar weight of the glass composition.

For example, the following powders can be used as first glass powders that are precursors of the first glass portion. Each of the powders with the following compositions has a packing density of 0.55 or more (recovery of indentation depth RID of 0 32 or less).

a) Powder obtained by pulverizing a bulk glass made of $4CuO-24Li_2O-12MgO-6CaO-6Al_2O_3-48B_2O_3$ (mol %) in a ball mill (particle size: 100 to 200 nm)
  b) Powder obtained by pulverizing a bulk glass made of $4CuO-24Na_2O-12MgO-6CaO-6Al_2O_3-48B_2O_3$ (mol %) in a ball mill (particle size: 100 to 200 nm)
  c) Powder obtained by pulverizing a bulk glass made of $4CuO-24K_2O-12MgO-6CaO-6Al_2O_3-48B_2O_3$ (mol %) in a ball mill (particle size: 100 to 200 nm)
  d) Powder obtained by pulverizing a bulk glass made of $4CuO-12K_2O-12Na_2O-12Li_2O-6Al_2O_3-54B_2O_3$ (mol %) in a ball mill (particle size: 100 to 200 nm)
  e) Nanopowder obtained by vitrifying glass powder made of $5NiO-20Na_2O-75B_2O_3$ (mol %) by a radio frequency thermal plasma process (particle size: 10 to 30 nm)
  f) Powder obtained by pulverizing a bulk glass made of $4CuO-26Cs_2O-70SiO_2$ (mol %) in a ball mill (particle size: 100 to 200 nm)
  g) Powder obtained by pulverizing a bulk glass made of $5Sm_2O_3-20Na_2O-75B_2O_3$ (mol %) in a ball mill (particle size: 100 to 200 nm)

Glasses with the above compositions can be produced by using NiO, CuO, $Sm_2O_3$, $Li_2CO_3$, $Na_2CO_3$, $K_2CO_3$, MgO, $CaCO_3$, $Al_2O_3$, $B_2O_3$, and $SiO_2$ reagents as raw materials, specifically, by melting the reagents in a platinum crucible at 900 to 1500° C. for 2 hours, pouring the resultant melted material onto a carbon plate, and letting it cool. The first glass powders are obtained by pulverizing each of the glasses with the above compositions in a ball mill.

For example, the following powders can be used as second glass powders that are precursors of the second glass portion. Each of the powders with the following compositions has an ion packing density of 0.47 or less (recovery of indentation depth RID of 0.38 or more). The following powders (a') and (b') are powder reagents, and a Vickers test cannot be performed on these powders. Therefore, the density and RID values of molten quartz glass plates (made by Tosoh Corporation) with the same compositions as these powders are used as the density and RID values of these powders.

a') Amorphous $SiO_2$ (particle size: 1 µm, made by Kojundo Chemical Lab. Co., Ltd.) (hereinafter also referred to as micro-$SiO_2$)

b') Amorphous $SiO_2$ (particle size: 20 to 30 nm, made by Sigma-Aldrich Japan KK) (hereinafter also referred to as nano-$SiO_2$)

c') Powder obtained by pulverizing a bulk glass made of $81SiO_2$-$13B_2O_3$-$2Al_2O_3$-$3Na_2O$-$1K_2O$ (mol %) in a ball mill (particle size: 100 to 200 nm)

TABLE 1

| Glass Precursor | Glass Transition Temperature (° C.) | Density (g/cm3) | Ion Packing Density | Indentation Depth Before Recovery (µm) | Indentation Depth After Recovery (µ) | RID |
|---|---|---|---|---|---|---|
| (a) | 450 | 2.51 | 0.621 | 3.31 | 2.33 | 0.30 |
| (b) | 440 | 2.50 | 0.585 | 3.68 | 2.95 | 0.20 |
| (c) | 430 | 2.35 | 0.560 | 2.87 | 2.25 | 0.22 |
| (d) | 375 | 2.36 | 0.586 | 3.59 | 2.45 | 0.32 |
| SiO2(Same for a' and b') | 1050 | 2.20 | 0.456 | 2.70 | 1.52 | 0.44 |
| (c') | 525 | 2.23 | 0.462 | 3.16 | 1.97 | 0.38 |
| (a):(c') = 5:5 Optical Heating at 1.8 kW | | | | 3.31 | 2.08 | 0.37 |
| (a):(c') = 5:5 Heat Treatment at 1000° C. for 1 hr | | | | 3.10 | 2.00 | 0.35 |

Table 1 shows the calculated glass transition temperature, density, ion packing density Cg, indentation depth before recovery, indentation depth after recovery, and recovery of indentation depth RID of each glass precursor. The results in Table 1 show that a glass containing a large amount of alkali metal ions that is a modifier and a glass containing $B_2O_3$ as a network former have a high ion packing density Cg.

Table 1 shows the results of the glass transition temperatures of the glasses as measured by differential thermal analysis. It is preferable to select first and second glass powders so that the first glass powder has a lower glass transition temperature than the second glass powder.

FIG. 1 is a diagram showing the relationship between ion packing density and free energy. In the figure, "precursor glass A" is a glass with a low ion packing density, and "precursor glass B" is a glass with a high ion packing density. When a mixture of the powder of the precursor glass A and the powder of the precursor glass B is cooled after melted according to a normal glass synthesis method, a density change of ions in the precursor glass A and ions in the precursor glass B is within an allowable range that achieves thermodynamic stability. That is, the ion packing density is almost uniform in the entire glass, and there is no heterogeneity.

A phase separated glass described in Non-Patent Literature 1 is known as a glass having glass portions with different compositions. This glass is a glass composed of two or more types of glass components having low miscibility with each other. These glass components form a homogeneous state in the form of a melt or a glass obtained by rapidly cooling the melt. However, when heat treated under appropriate conditions, the two components having low miscibility with each other appear as glass portions with different compositions. Low miscibility means that these two glass portions are not strongly bonded.

As shown in FIG. 2, there are two forms of phase separation: binodal phase separation in which glass regions with different compositions precipitate like a sea and islands, and spinodal phase separation in which glass portions with different compositions precipitate in an interconnected pattern. In the binodal phase separation mechanism in which glass portions precipitate like a sea and islands, clear composition boundaries are formed at the interfaces between the glass portions.

When the glass portions have different coefficients of thermal expansion, thermal stress is applied to the narrow regions at the interfaces, and the glass therefore breaks easily. The elastic and mechanical properties (Young's modulus, Poisson's ratio, hardness, etc.) vary depending on the glass portion. Therefore, when under load, the glass portions are deformed differently, and large strain tends to occur at the interfaces.

In the spinodal phase separation in which the phase separation regions are connected in a one- or two-dimensional shape, a gentle composition distribution is formed in the initial to intermediate stage, but clear interfaces are formed eventually. It is not possible to induce phase separation in the shape of a sea and islands with a gentle composition distribution or to induce a large composition distribution while keeping the composition distribution gentle. Whether phase separation occurs and the rate at which phase separation occurs are substantially determined thermodynamically according to the compositions, it is not possible to control the compositions and sizes of the phase separation regions as desired.

Since the compositions of the glass portions after separation are not preparation compositions but are determined thermodynamically, it is extremely difficult to intentionally precipitate a portion with a composition having a specific physical property, and it is difficult to cause glass portions having such physical properties that significantly increase strength to coexist. Therefore, there is no glass whose strength is significantly increased by phase separation.

In the present invention, glass portions with compositions having desired physical properties can be generated with intended sizes and with significantly different compositions, even when the combination of compositions is a combination that is not possible in the phase separation mechanism and that thermodynamically forms a homogeneous state. In the present invention, as shown in FIG. 1, a process of changing to a homogeneous state that is a thermodynamically stable state by a diffusion process is frozen. This homogenization process is illustrated in FIG. 3. A region that used to be an interface forms a gentle composition distribution by diffusion. Accordingly, no significantly brittle interface as in a phase-separated glass is formed.

(Characteristics of Glass of the Present Invention)

In the present invention, heat treatment conditions are appropriately set so that a glass portion with a low ion packing density (second glass portion) and a glass portion with a high ion packing density (first glass portion) remain even after cooling. Since coarse glass portions have lower light transmission properties and it is preferable that each glass portion be small in order to increase the impact on deformation and breakage of each glass portion, glass was produced so that at least one glass portion was 1 μm or less. From a thermodynamic point of view, two portions with significantly different ion packing densities being present in the glass means an unstable free energy state. In the present invention, a mixed state with different compositions and a large amount of energy that cannot essentially exist is intentionally formed as a local structure to implement huge compositional fluctuations. In other words, an excessive thermodynamic nonequilibrium state is frozen.

The high-density glass portion (first glass portion) has a property that, out of plastic deformation characteristics, plastic flow is dominant. The high-density glass portion (first glass portion) therefore dissipates or reduces stress concentration. On the other hand, the low-density glass portion (second glass portion) has such a property that reduces voids when pressed, namely a property that, out of the plastic deformation characteristics, densification is dominant. The low-density glass portion (second glass portion) therefore absorbs stress.

FIG. 3 is a diagram schematically showing that a high-density glass portion and a low-density glass portion remain in a glass after heat treatment, and also shows graphs showing a change in density and a change in glass transition temperature. Before heat treatment, each of high-density glass powder (first glass powder) and low-density glass powder (second glass powder) has a certain ion packing density and a certain glass transition temperature.

In the graph showing a change in density and the graph showing a change in glass transition temperature, line a shows the state of mixed powder before heat treatment. Even after the heat treatment is started, the glass has high viscosity and ion diffusion is slow if the temperature is below the glass transition temperature of the high-density glass powder. The ion diffusion proceeds when heated to the glass transition temperature of the high-density glass powder or higher. When heated at a temperature higher than the glass transition temperature of the low-density glass powder for a sufficient amount of time, the ion diffusion proceeds sufficiently, and the composition eventually becomes uniform in the entire glass as shown by line c. The glass transition temperature therefore becomes uniform in the entire sample.

In the present invention, the heat treatment conditions are appropriately selected so that the glass portions with different compositions (ion packing densities) remain with their interface in which the composition changes gently as shown by line b and that the resultant glass exhibits heterogeneity. For example, in order to more effectively reduce homogenization due to diffusion, a combination of glass powders to be used as raw materials is selected so that the glass portion with a high ion packing density (first glass portion) has a low glass transition temperature and the glass portion with a low ion packing density (second glass portion) has a high glass transition temperature. Since homogenization due to diffusion is slow in the second glass portion with a high glass transition temperature, the second glass portion with a high glass transition temperature remains as it is.

The diffusion coefficient (D) is given by the following Einstein-Stokes equation (1).

$$D = k_B T / C \pi \eta a \qquad \text{Equation (1)}$$

In the equation, C represents a constant, $k_B$ represents the Boltzmann constant, T represents an absolute temperature, η represents viscosity, and a represents a particle size or molecular size. This equation shows that the diffusion coefficient is proportional to the reciprocal of viscosity. The viscosity η at a temperature at which a melt to be vitrified is present is given by the following Vogel-Fulcher-Tammann (VFT) equation (2).

$$\log_{10} \eta = A + B/(T - T_0) \qquad \text{Equation (2)}$$

In the equation, A, B, and $T_0$ can be handled as material specific constants, the viscosity has a logarithmic relationship with the reciprocal of "$T - T_0$." That is, the viscosity changes greatly even with a slight change in temperature. This change is significant near the glass transition temperature.

The temperature range in which the viscosity is $10^{12}$ to $10^{13.5}$ Pa·s is called the glass transition range. This temperature range is a temperature range over which transition from a glass state to a supercooled liquid occurs. When the viscosity becomes higher than around $10^{6.65}$ Pa·s, large deformation occurs when a load is applied. In a temperature range lower than the glass transition temperature, it is difficult for particles to react sufficiently and get fused together because they are a solid in this temperature range. Heating therefore needs to be performed at the glass transition temperature or higher. When heat treatment is performed at a temperature higher than the glass transition temperature, the diffusion rate increases and homogenization proceeds rapidly. In order to effectively cause glass portions with different compositions to remain in glass, it is preferable to perform heating at a temperature equal to or higher than the glass transition temperature of one glass portion and equal to or lower than the glass transition temperature of the other glass portion.

The diffusion coefficient varies depending on the ion species to be diffused. In order to reduce diffusion, it is preferable to perform heat treatment in a temperature range in which the viscosity is low, at least in a temperature range equal to or lower than the glass transition temperature, or when heat treatment is performed in a temperature range higher than the glass transition temperature, to use a rapid heating process that requires a very short reaction time.

Regarding selection of glass, glass mainly composed of $B_2O_3$ typically having low viscosity has a low glass transition temperature. Moreover, since three-coordinate boron has a planar structure, it is easy to pack ions without creating voids in the structure, and the ion packing density is high. Therefore, glass containing 48 mol % or more of $B_2O_3$ is suitable as the first glass portion because the glass transition temperature is low and the RID is also low.

Alternatively, even glass mainly made of $SiO_2$ has a low glass transition temperature when the glass contains a large amount of alkali metal ions and alkaline earth metal ions. This glass has a high ion packing density as alkaline metal ions and alkaline earth metal ions are packed by entering voids. Glass containing a large amount of $SiO_2$ has high viscosity and a high glass transition temperature. Especially glass with a $SiO_2$ content of 80 mol % or more has a low ion packing density as a large number of voids are created in the network structure made of $SiO_2$. Accordingly, glass with a high $SiO_2$ content is suitable as the second glass portion. The compositions of the first glass portion and the second glass portion were determined based on this guideline.

In order to cause intended glass portions with different composition to remain in glass, it is preferable to perform heat treatment on a mixture of a precursor powder that will form the high-density glass portion (first glass portion) and a precursor powder that will form the low-density glass portion (second glass portion) at a temperature equal to or higher than the glass transition temperature of the former precursor powder and equal to or lower than the glass transition temperature of the latter precursor powder. It is more preferable to selectively heat the precursor of the first glass portion than to perform uniform heating. For example, one possible method is to color the precursor of the first glass portion by adding light absorbing ions thereto and emit light to cause the precursor of the first glass portion to selectively absorb light and to cause the precursor of the first glass portion to generate heat by the energy of the absorbed light.

The glass after heat treatment has no clear boundary between the high-density glass portion with a high ion density and the low-density glass portion with a low ion density, and a change in properties (e.g., ion density, glass transition temperature, etc.) from the high-density glass portion to the low-density glass portion is continuous and smooth.

The high-density glass portion (first glass portion) and the low-density glass portion (second glass portion) in the glass are small and are dispersedly distributed. It is therefore not possible to locally cut out only the portion of each glass component and measure its ion density. Accordingly, the compositions of the high-density glass portion (first glass portion) and the low-density glass portion (second glass portion) of the glass are locally analyzed. Glass components are prepared, melted, and verified so as to achieve each analyzed composition, and the glass densities and ion packing densities of the resultant glasses are obtained. It can thus be verified that the high-density glass portion (first glass portion) and the low-density glass portion (second glass portion) are present in the glass.

Recovery of Indentation Depth RID

One possible criterion for evaluating whether plastic flow is dominant or densification is dominant is a method of obtaining the recovery of indentation depth by indentation depth measurement using indentation with a Vickers indenter. An indentation device is not limited to a common Vickers tester, and a nanoindentation tester, a compression testing machine, etc. may be used. The recovery of indentation depth RID is obtained as follows.

The recovery of indentation depth is given by $(Db-Da)/Db$, where $Db$ represents the Vickers indentation depth before heat treatment, and $Da$ represents the indentation depth after heat treatment (after heat treatment at such a temperature that eliminates residual stress).

For example, when the indentation depth before heat treatment is 1 μm and the indentation depth after heat treatment is 0.8 μm, RID is 0.2 and it can be determined that plastic flow is dominant. On the other hand, when the indentation depth before heat treatment is 1 μm and the indentation depth after heat treatment is 0.2 μm, RID is 0.8 and it can be determined that densification is dominant. Densification is a phenomenon in which the glass structure is changed to a denser structure. Therefore, the lower the packing density of glass, the more the glass tends to be densified. For example, G. N. Greaves, A. L. Greer, R. S. Lakes, T. Rouxel, 'Poisson's ratio and modern materials,' Nature Materials, vol. 10, pp. 823-837 (published on Oct. 24, 2011), DOI: 10.1038/NMAT3134 describes that the higher the ion packing density of glass, the higher the Poisson's ratio of the glass. Moreover, T. Rouxel, H. Ji, T. Hammouda, A. More'ac., 'Poisson's Ratio and the Densification of Glass under High Pressure,' PHYSICAL REVIEW LETTERS, Vol. 100, pp. 225501-1 to 225501-4 (published on Jun. 3, 2008), DOI: https://doi.org/10.1103/PhysRevLett.100.225501 describes that the higher the Poisson's ratio of glass, the lower the recovery of indentation depth of the glass. That is, the higher the ion packing density of glass, the lower the recovery of indentation depth of the glass.

Glass according to one embodiment of the present invention includes the first glass portion and the second glass portion, and the ion packing density of the second glass portion is lower than that of the first glass portion. Since plastic deformation of the second glass portion mainly proceeds by the mechanism of densification, the recovery of indentation depth of the second glass portion is higher than that of the first glass portion.

Preferably, the recovery of indentation depth of the first glass portion is less than 0.35, and the recovery of indentation depth of the second glass portion is 0.35 or more. More preferably, the recovery of indentation depth of the first glass portion is 0.2 or more and less than 0.35, and the recovery of indentation depth of the second glass portion is 0.35 or more and 0.8 or less. Table 1 shows the calculated ion packing densities Cg of the first and second glass powders used as raw materials. Table 1 also shows the values of the recovery of indentation depth RID of the glasses used as raw materials of the first and second glass powders before pulverization. The glass species (a), (b), (c), (d), (a'), (b'), and (c') shown in Table 1 are the same as the glass species with the same letters described above.

For glass obtained by heat treating a mixed powder, the recovery of indentation depth RID cannot be locally measured. Accordingly, the compositions of the first and second glass portions of the obtained glass are analyzed, and materials are melted and vitrified so as to achieve each analyzed composition. The values of the recovery of indentation depth RID of the resultant glasses are regarded as RIDs of the first and second glass portions.

The glass according to the present invention achieves significantly higher crack resistance than conventional glass. Therefore, the glass according to the present invention can be effectively used in various applications that require aesthetic appearance, transparency, and crack resistance of glass, such as sealing members using glass, containers like glass bottles and glasses, materials for windows and exterior parts of cars and buildings, interiors like glass tables, covers and display units that protect devices like smartphones and displays.

EXAMPLE 1

[Sample Preparation]

A plurality of pairs of glass powders with different ion packing densities were prepared. The recovery of indentation depth RID can also be classified into two types according to the difference in ion packing density.

Glass powders with the following compositions have an ion packing density of 0.55 or more (RID of 0.32 or less).
  a) $4CuO-24Li_2O-12MgO-6CaO-6Al_2O_3-48B_2O_3$
  b) $4CuO-24Na_2O-12MgO-6CaO-6Al_2O_3-48B_2O_3$
  c) $4CuO-24K_2O-12MgO-6CaO-6Al_2O_3-48B_2O_3$ d) $4CuO-12K_2O-12Na_2O-12Li_2O-6Al_2O_3-54B_2O_3$
e) $5NiO-20Na_2O-75B_2O_3$
f) $4CuO-26Cs_2O-70SiO_2$ Glass powders with the following compositions have an ion packing density of 0.47 or less (RID of 0.38 or more).
  a') Amorphous $SiO_2$ (particle size: 1 μm, made by Kojundo Chemical Lab. Co., Ltd.)
  b') Amorphous $SiO_2$ (particle size: 20 to 30 nm, made by Sigma-Aldrich Japan KK)
  c') Powder obtained by pulverizing $81SiO_2-13B_2O_3-2Al_2O_3-3Na_2O-1K_2O$ (mol %) in a ball mill (particle size: 100 to 200 nm)

The glass powders with the above compositions except for (a') and (b') that are originally fine powder glasses were powders each produced by preparing a bulk glass by a melting and rapid cooling method and pulverizing the bulk glass in a ball mill. Glasses with the above compositions were produced by using NiO, CuO, $Sm_2O_3$, $Li_2CO_3$, $Na_2CO_3$, $K_2CO_3$, MgO, $CaCO_3$, $Al_2O_3$, $B_2O_3$, and $SiO_2$ reagents as raw materials, specifically, by melting the reagents in a platinum crucible at 900 to 1500° C. for 2 hours, pouring the resultant melted material onto a carbon plate, and letting it cool. The first and second glass powders were obtained by pulverizing each of the glasses with the above compositions in a three-dimensional ball mill (3DB-80 made by Nagao System) rotated at 300 rpm about a horizontal rotation axis and 300 rpm about a vertical rotation axis for one hour. The obtained glass powders had a particle size of 100 to 200 mm as observed with a scanning electron microscope.

The following various glass samples were prepared with a mixing ratio of one type of glass powder with a high ion packing density (low RID) (first glass powder) to one type of glass powder with a low ion packing density (high RID) (second glass powder) being 7:3, 5:5, and 3:7 by weight (see the "sample" column in Table 2).

The following two heating methods were used in order to obtain a bulk body by heating a mixed powder.
  i) A method in which a transition metal oxide is added to the first glass powder with a low glass transition temperature and heated with input energies of 6 to 18 kW by an infrared lamp heater (parabolic reflector tubular furnace P610C made by ADVANCE RIKO, Inc.). A transition metal is added to the first glass powder with a low glass transition temperature because the transition metal acts as a heating source and the first glass powder with a low glass transition temperature can be softened first. The influence of adding a transition metal oxide on the glass transition temperature is sufficiently small.
  ii) A method in which heat treatment is performed at a temperature of 800 to 1200° C. by a resistance furnace (FP-01X manufactured by FULL-TECH CORPORATION).

For comparison, a glass was prepared by melting and rapid cooling, namely by a normal glass synthesis method.
  iii) A method in which a glass is obtained by placing a mixed powder in a platinum crucible, melting the mixed powder at 1400° C. for one hour in an electric furnace (SUPER-BURN made by Motoyama), and then cooling the resultant melted glass. The obtained glass was mirror polished.

The glass transition temperatures of the obtained glass samples were obtained by differential thermal analysis.

After preparing glasses by these methods, the glasses were reheated at their glass transition temperatures to reduce thermal strain.

[Comparison of Transmittance]

A change in transmittance caused by adding a transition metal to glass to be used as a raw material to be pulverized was measured.

The following glass plates were used.
  1) $5NiO-20Na_2O-75B_2O_3$ (Ni added)
  2) $5Sm_2O_3-20Na_2O-75B_2O_3$ (Sm added)
  3) $4CuO-24Na_2O-12MgO-6CaO-6Al_2O_3-48B_2O_3$ (Cu added)
  4) $25Na_2O-75B_2O_3$ (nothing added)

Figure 4:
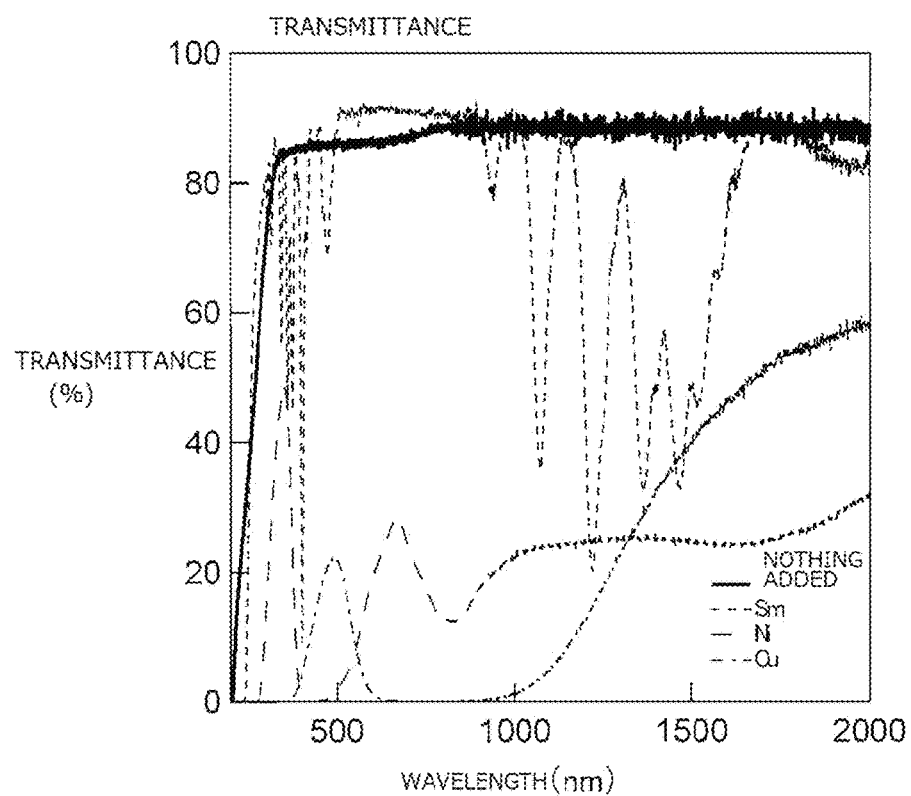
FIG. 4 is a diagram showing the relationship between wavelength and transmittance.

Each of materials composed of CuO, NiO, $Sm_2O_3$, $Na_2O$, $CaCO_3$, MgO, $Al_2O_3$, and $B_2O_3$ so as to have the above compositions was placed in a platinum crucible, melted at 1000 to 1200° C. for one hour in an electric furnace, and poured onto a carbon plate. The obtained glasses were mirror polished to a thickness of 1 mm, and their transmittance was measured with an absorptiometer (UH-4150 made by Shimadzu Corporation). The results are shown in FIG. 4.

A light absorption band appeared in the near-infrared region (750 to 2000 nm) as the glass contained transition metal ions and rare earth ions. This is electronic transitions derived from transitions of the transition metal ions from one d-orbital to another d-orbital or transitions of the rare earth ions from one f-orbital to another f-orbital. Since the infrared lamp heater uses black body radiation such as a halogen lamp, the center wavelength is around 1000 nm. Therefore, a glass having light absorption in this wavelength region can be suitably optically heated by the infrared lamp heater.

[Electron Microscope Observation]

The following mixed powder and mixing ratio were used.
  First glass powder (low RID): (f) $4CuO-26Cs_2O-70SiO_2$
  Second glass powder (high RID): (b') amorphous $SiO_2$ (particle size: 20 to 30 nm, made by Sigma-Aldrich Japan KK)
  First glass powder:second glass powder=5:5

The first glass powder and the second glass powder were mixed at 5:5 to prepare pellets. The pellets were heat treated under different heating conditions to produce bulk glasses. One glass was obtained as a bulk glass by irradiation with an infrared lamp with an input energy of 6 to 18 kW for 10 seconds. The other glass was obtained by placing the same raw material in a platinum crucible, melting it at 1400° C. for one hour in an electric furnace (SUPER-BURN made by Motoyama), pouring the resultant melted material onto a carbon plate, and cooling and solidifying the melted material (normal glass synthesis method). The latter is glass prepared from a homogeneous melt obtained by melting the raw material at a sufficiently high temperature for a long time.

Figure 5:
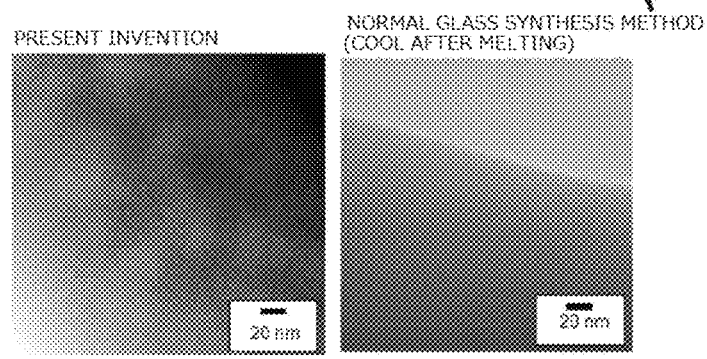
FIG. 5 shows transmission electron microscope images of a glass according to the present invention (left) obtained by mixing glass raw material powders (f), (b') at (f):(b')=5:5 and optically heating the mixed powder, and a glass (right) obtained by melting the mixed powder at a high temperature so that the resultant glass is homogeneous.

The image on the left of FIG. 5 shows the glass synthesized by the short-time irradiation with the infrared lamp. This image shows that low-density and high-density glass portions remain in the glass. Since NiO that absorbs infrared light is added only to the first glass powder, the first glass powder can be selectively rapidly heated. The amount of cesium (Cs) in the dark black portion is 32 wt %, and the amount of cesium (Cs) in the whitish black portion is 5 wt %.

On the other hand, the glass prepared by the normal glass synthesis method, which is shown by the image on the right of FIG. 5, exhibits a homogeneous contrast and is homogeneous. Such highly homogeneous glass is obtained by the normal melting method. However, homogenization does not sufficiently proceed by the short-time optical heating, and the first and second glass portions with compositions close to the compositions of the first and second glass powders, respectively, coexist in the glass obtained by the short-time optical heating.

[Cracking Test]

The following mixed powder and mixing ratio was used.

First glass powder (low RID): (c) $24K_2O\text{-}12MgO\text{-}6CaO\text{-}6Al_2O_3\text{-}48B_2O_3\text{-}4CuO$ Second glass powder (high RID): (c') $81SiO_2\text{-}13B_2O_3\text{-}2Al_2O_3\text{-}3Na_2O\text{-}1K_2O$ (mol %)

The first glass powder and the second glass powder were mixed at 7:3. Pellets prepared from the mixed powder were heat treated under different conditions to produce glasses. Glasses for comparison were also prepared by mirror polishing a first glass and a second glass before pulverization, namely first and second bulk glasses. Each glass was indented with a Vickers indenter under a load of 9.8 N to examine whether cracking occurred and how many cracks appeared. For example, FIG. 6 shows the results obtained by indenting the glasses with a Vickers indenter under a load of 9.8 N.

Figure 6:
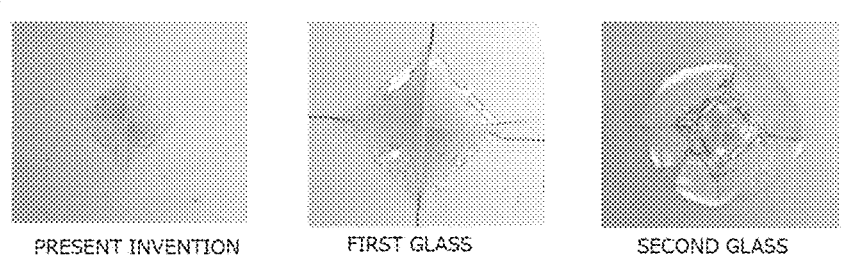
FIG. 6 shows images showing the results of a cracking test for a glass (present invention) obtained by mixing glass raw material powders (c), (c') at (c):(c')=7:3 and optically heating the mixed powder, a (c) glass, and a (c') glass.

The image on the left of FIG. 6 shows a glass obtained by irradiating the above mixed powder with an infrared lamp with an input energy of 14 kW for one minute (present invention). In order to eliminate the influence of thermal stress due to rapid cooling, the mixed powder was heat treated at the glass transition temperature of the first glass portion for 30 minutes and slowly cooled. No cracks developed from the four corners of the Vickers indentation under a load of 9.8 N. This shows that cracks were less likely to appear as the first glass portion and the second glass portion coexisted.

The image in the middle of FIG. 6 shows a plate glass with only the first glass composition. Cracks developed from the four corners of the quadrangular pyramid-shaped Vickers indentation under a load of 9.8 N (comparative example).

The image on the right of FIG. 6 shows a plate glass with only the second glass composition. Cracks developed from the four corners of the Vickers indentation under a load of 9.8 N (comparative example).

The above results show that, by performing heat treatment for a short time by rapid heating in which the mixture of the first glass containing CuO that absorbs near-infrared light and the second glass is optically heated to selectively heat the first glass, the first and second glass portions can coexist in the resultant glass, and cracking under load can be significantly reduced.

In the following experiments, resistance to cracking was measured with a cracking probability being 100% in the case where clear cracking occurs from all of the four corners of a quadrangular pyramid-shaped Vickers indentation. The cracking probability is 25% when cracking occurs from only one of the four corners, 50% when cracking occurs from two of the four corners, 75% when cracking occurs from three of the four corners, and 100% when cracking occurs from the four corners. The crack length was not considered, and any crack was counted as one clack. Twenty measurements were made for each sample, and the average was calculated. The load corresponding to the cracking probability of 50% is defined as a cracking load. The cracking load of each sample was obtained using the loads in the range of 0.098 to 19.6 N.

Figure 7:
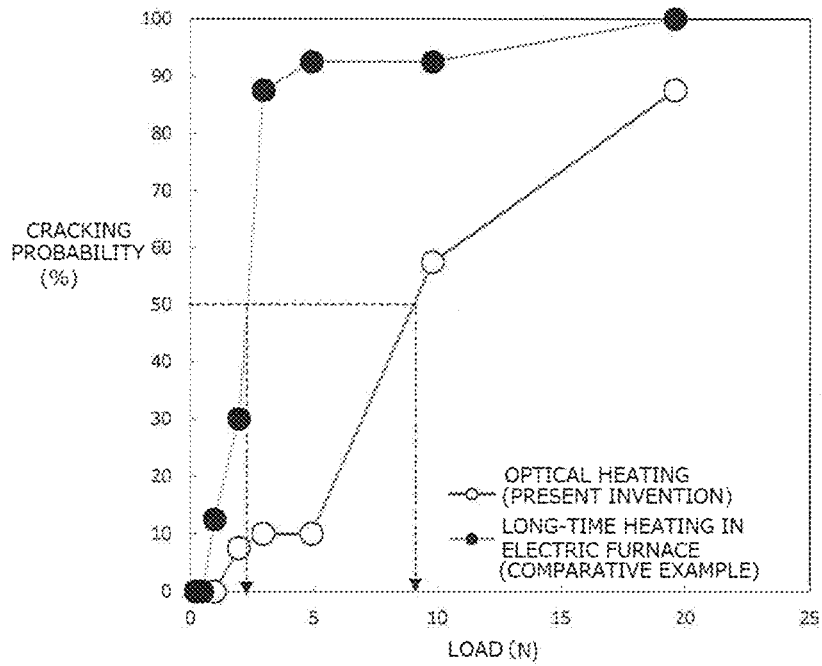
FIG. 7 is a diagram showing cracking probabilities of a glass (present invention) obtained by mixing glass raw material powders (e), (e') at (e):(e')=7:3 and optically heating the mixed powder and a glass obtained by heat treating the mixed powder in an electric furnace.

A) Results Shown in FIG. 7

The following mixed powder and mixing ratio were used.

First glass powder (low RID): (e) $5NiO\text{-}20Na_2O\text{-}75B_2O_3$

Second glass powder (high RID): (a') amorphous $SiO_2$ (particle size: 1 μm)

First glass powder:second glass powder=7:3

The following two heat treatment conditions were used for the mixed powder.

(Symbol ○) Irradiate the mixed powder with a 12 kW infrared lamp for one minute (optical heating)

(Symbol ●) Hold the mixed powder in an electric furnace at 1000° C. for one hour (electric furnace heating)

According to the results shown in FIG. 7, the glass (○) according to the present invention obtained by irradiating the mixed powder with a 12 kW infrared lamp for one minute has a lower cracking probability than the glass (●) for comparison obtained by holding the mixed powder in an electric furnace at 1000° C. for one hour. As shown by dashed lines in FIG. 7, it is also possible to compare the resistance to cracking using the cracking load, that is, the load corresponding to the cracking probability of 50%. The results show that performing heat treatment for a very short time using light radiation can reduce the diffusion time and can effectively reduce homogenization, so that cracking is less likely to occur even under larger loads.

Figure 8:
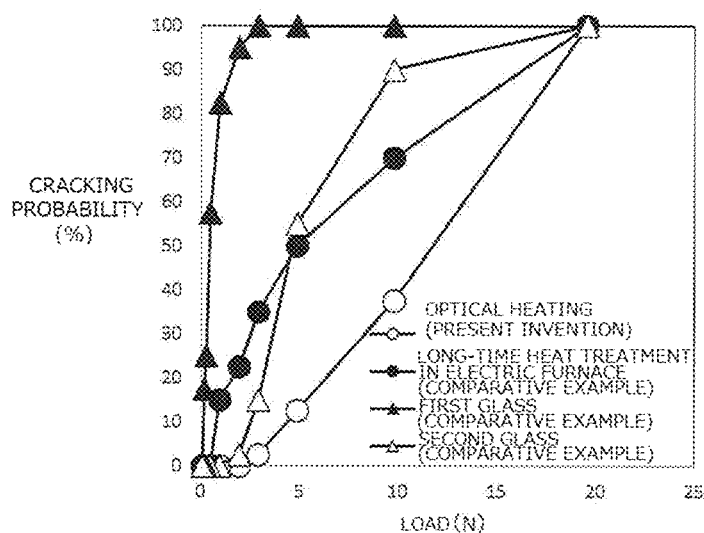
FIG. 8 is a diagram showing cracking probabilities of a glass (present invention) obtained by mixing glass raw material powders (a), (c') at (a):(c')=7:3 and optically heating the mixed powder, a glass obtained by heat treating the mixed powder in an electric furnace, an (a) glass, and a (c') glass.

B) Results Shown in FIG. 8

The following mixed powder and mixing ratio were used.

First glass powder (low RID): (a) $4CuO\text{-}24Li_2O\text{-}12MgO\text{-}6CaO\text{-}6Al_2O_3\text{-}48B_2O_3$ Second glass powder (high RID): (c') $81SiO_2\text{-}13B_2O_3\text{-}2Al_2O_3\text{-}3Na_2O\text{-}1K_2O$ (mol %)

The first glass powder and the second glass powder were mixed at 7:3. The mixed powder was pressed into pellets, and the pellets were heat treated under different conditions to produce glasses. Each glass was indented with a Vickers indenter under loads in the range of 0.098 to 480 N to obtain the cracking probability for each load.

(Symbol ○) Glass produced by performing quick heating for a short time, namely by irradiating the pellets with a 16 kW infrared lamp for one minute, so that the first and second glass portions coexist (present invention)

(Symbol ●) Glass produced by holding the pellets in an electric furnace at 1400° C. for one hour so that homogenization sufficiently proceeds by melting (comparative example: homogeneously melted glass)

(Symbol Δ) $24Li_2O\text{-}12MgO\text{-}6CaO\text{-}6Al_2O_3\text{-}48B_2O_3\text{-}4CuO$ (comparative example: glass that is a raw material of the first glass portion)

(Symbol ▲) Glass made of $81SiO_2\text{-}13B_2O_3\text{-}2Al_2O_3\text{-}3Na_2O\text{-}1K_2O$ (comparative example: glass that is a raw material of the second glass portion)

According to the results shown in FIG. 8, the glass (○) according to the present invention obtained by irradiating the pellets with a 16 kW infrared lamp for one minute has a lower cracking probability than the glass (●) for comparison obtained by holding the pellets in an electric furnace at 1400° C. for one hour. The first glass portion and the second glass portion do not remain in the glass obtained by heating and melting the pellets at 1400° C. for one hour, and the composition is homogeneous in the entire glass. On the other hand, when the optical heating is used for the pellets of the mixed powder of the first and second glass powders, diffusion is reduced as the optical heating is short-time heat treatment. As a result, the first glass portion and the second glass portion coexist in the resultant glass. Accordingly, this glass has a lower cracking probability than the following glasses for comparison: the first glass (Δ) made only of the first glass components and the second glass (▲) made only of the second glass components.

Figure 9:
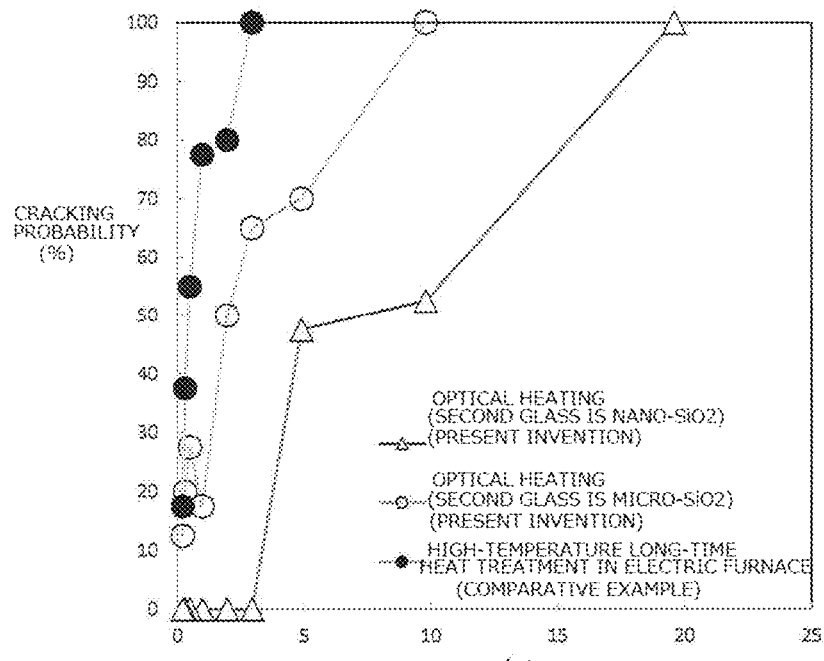
FIG. 9 is a diagram showing cracking probabilities of glasses (present invention) obtained by mixing glass raw material powders (b), (a') at (b):(a')=5:5 and mixing glass raw material powders (b), (b') at (b):(b')=5:5 and optically heating the mixed powders, and a glass obtained by heat treating the mixed powder in an electric furnace.

C) Results Shown in FIG. 9

The following mixed powder and mixing ratio were used.

First glass powder (low RID): (b) $24Na_2O\text{-}12MgO\text{-}6CaO\text{-}6Al_2O_3\text{-}48B_2O_3\text{-}4CuO$ (mol %)

Second glass powder (high RID): (a') amorphous $SiO_2$ (particle size: 1 μm) and (b') amorphous $SiO_2$ (20 to 30 nm)

First glass powder:second glass powder=5:5

The following two heat treatment conditions were used for the mixed powder.

(Symbol Δ) Use amorphous $SiO_2$ (particle size: 20 to 30 nm) as a raw material and irradiate the mixed powder with a 16 kW infrared lamp for one minute (present invention: the first glass portion and the nanosized second glass portion coexist due to the optical heating)

(Symbol ○) Use amorphous $SiO_2$ (particle size: 1 μm) as a raw material and irradiate the mixed powder with a 16 kW infrared lamp for one minute (present invention: the first glass portion and the microsized second glass portion coexist due to the optical heating)

(Symbol ▲) Use amorphous $SiO_2$ (particle size: 1 μm) as a raw material and hold the mixed powder in an electric furnace at 1400° C. for one hour (comparative example: homogenized by the electric furnace heating)

According to the results shown in FIG. 9, in the glasses (Δ, ○) according to the present invention obtained by irradiating the mixed powder with a 16 kW infrared lamp for one minute, the first glass portion and the second glass portion coexist due to the short-time heating.

Regardless of whether the nano-$SiO_2$ or the micro-$SiO_2$ was used as a raw material, the glasses according to the present invention have a lower cracking probability than the glass for comparison further homogenized by holding the mixed powder in an electric furnace at 1400° C. for one hour. The sizes of the coexisting glass portions are determined by the sizes of the raw materials. If each glass portion obtained by optical heating is too coarse, the interface regions in which the composition gradually changes narrow as compared to the size of each glass portion. If the interface regions are narrow, only one glass is deformed during deformation, contribution of the interface regions to deformation of both glasses cannot be maximized. The glass portions are particularly preferably 1 micrometer or less in size, and the cracking probability is lower when using the nano-$SiO_2$ than using the micro-$SiO_2$ (○, Δ).

[Cracking Load]

The load corresponding to the cracking probability of 50% is defined as a cracking load, and the values of the cracking load are shown in Table 2. The cracking load was examined using various combinations and mixing ratios of the first and second glasses and various heat treatment conditions. The results are shown in Table 2 below. In Table 2, a, b, c, d, e, a', b', and c' described in the "sample" column represent the glass powders described in the above [Recovery of Indentation Depth RID] section. In Table 2, the samples shown as obtained by "optical heating" are the glasses according to the present invention obtained by performing heat treatment for a short time, namely by irradiating the mixed powder with an infrared lamp for one minute so that the first glass portion and the second glass portion remained in the glass. The samples shown as obtained by "heat treatment" are the homogenous glasses obtained by performing heat treatment for a long time using an electric furnace so that the first glass portion and the second glass portion disappear (comparative examples). The samples with the symbol ○ for "property improved by optical heating" are the glasses obtained by optically heating the mixed powder so that the first glass portion and the second glass portion remained in the glass, and as a result of the optical heating, having a higher cracking load than the samples obtained by homogeneous heat treatment.

TABLE 2

| Sample | Heat Treatment Condition | Cracking Load (N) | Property Improved by Optical Heating |
|---|---|---|---|
| (a):(c') = 5:5 | Optical Heating at 12 kW for 1 min | 2.32 | ○ |
|  | Heat Treatment at 1000° C. for 1 hr | 2.06 | — |
| (a):(c') = 3:7 | Optical Heating at 12 kW for 1 min | 11.8 | ○ |
|  | Heat Treatment at 1000° C. for 1 hr | 4.9 | — |
| (b):(c') = 7:3 | Optical Heating at 8 kW for 1 min | 0.747 | ○ |
|  | Optical Heating at 8 kW for 2 min | 1.37 | ○ |
|  | Optical Heating at 10 kW for 1 min | 0.784 | ○ |
|  | Optical Heating at 12 kW for 1 min | 0.129 | ○ |
|  | Optical Heating at 16 kW for 1 min | 0.0796 | ○ |
|  | Heat Treatment at 1000° C. for 1 hr | 0.0333 | — |
| (b):(c') = 5:5 | Optical Heating at 10 kW for 1 min | 0.335 | ○ |
|  | Optical Heating at 16 kW for 1 min | 0.735 | ○ |
|  | Optical Heating at 18 kW for 1 min | 0.98 | ○ |
|  | Heat Treatment at 1000° C. for 1 hr | 0.221 | — |
| (b):(c') = 3:7 | Optical Heating at 14 kW for 1 min | 1.26 | ○ |
|  | Heat Treatment at 1000° C. for 1 hr | 0.882 | — |
| (c):(c') = 5:5 | Optical Heating at 10 kW for 1 min | 0.597 | ○ |
|  | Heat Treatment at 800° C. for 1 hr | 0.158 | — |
| (d):(c') = 5:5 | Optical Heating at 9 kW for 1 min | 0.343 | ○ |
|  | Optical Heating at 12 kW for 1 min | 0.098 | ○ |
|  | Heat Treatment at 800° C. for 1 hr | 0.0283 | — |
| (e):(a') = 5:5 | Optical Heating at 12 kW for 1 min | 0.903 | ○ |
|  | Heat Treatment at 1000° C. for 1 hr | 0.23 | — |
| (b):(b') = 5:5 | Optical Heating at 16 kW for 1 min | 0.735 | ○ |
| (b):(a') = 5:5 | Optical Heating at 16 kW for 1 min | 0.196 | ○ |
| (b):(a') = 5:5 | Melt in Electric Furnace at 1400° C. for 1 hr | 0.0434 | — |

The results in Table 2 show that the glasses according to the present invention (optically heated samples) have a higher cracking load as compared to the homogeneous heating in an electric furnace. The glasses obtained by performing heat treatment for a long time in an electric furnace are more homogeneous. On the other hand, since the optical heating is short-time rapid heating, the first glass portion and the second glass portion coexist in the resultant glass. The samples whose property was improved by the optical heating as compared to the homogeneous heating in an electric furnace are shown with the symbol ○ in Table 2, and the property was improved in all the combinations examined in this experiment. That is, the results in Table 2 show that glasses with low brittleness are obtained by causing the first and second glass portions to coexist using the combinations of the first and second glass portions.

EXAMPLE 2

[Sample Preparation]

Mixed powders of a plurality of pairs of glass powders different in ion packing density (recovery of indentation depth RID) were prepared.

A glass powder with the following composition has an ion packing density of 0.55 or more (RID of 0.32 or less).

g) $B_2O_3$

Glass powders with the following compositions have an ion packing density of 0.47 or less (RID of 0.38 or more).

a') Amorphous $SiO_2$ (particle size: 1 μm, made by Kojundo Chemical Lab. Co., Ltd.)

b') Amorphous $SiO_2$ (particle size: 20 to 30 nm, made by Sigma-Aldrich Japan KK)

d') Powder obtained by pulverizing $81SiO_2$-$13B_2O_3$-$2Al_2O_3$-$3Na_2O$-$1K_2O$ (mol %) in a ball mill The mixing ratio of one glass powder with a high ion packing density (first glass powder) and one glass powder with a low ion packing density (second glass powder) was 7:3 by weight. The glass transition temperatures of these glass powders were obtained by differential thermal analysis.

A method in which the second glass powder is mixed with a precursor solution that forms the first glass and the resultant solution is dried is used to obtain each mixed powder. The resultant glass is a composite glass having a structure in which the first glass surrounds the second glass powder in the course of drying and vitrification.

In order to reduce homogenization due to diffusion and to effectively cause each glass portion to remain in the resultant glass, it is preferable to perform heat treatment at a temperature lower than the glass transition temperature of one glass. When merely heat treating the mixed power, a high temperature is required to obtain a dense bulk band. The following pressure heating methods were therefore used in order to obtain a bulk body by heating the mixed powder at a lower temperature.

i) A method in which a mixed powder is placed into a hot press mold (made of powder high-speed steel) capable of molding a cylindrical sample with an inner diameter of 13 mm and heat treating the mixed powder under a pressure of 1 MPa using a resistance furnace equipped with a press. A dense bulk body can be obtained as bubbles or voids are compressed at a lower temperature.

For comparison, a glass was produced by melting and rapid cooling, namely, by a normal glass synthesis method.

ii) A method in which a glass is obtained by placing a mixed powder in a platinum crucible, melting the mixed powder at 1400 to 1600° C. for one hour in an electric furnace (SUPER-BURN made by Motoyama), and then cooling the resultant melted glass. The obtained glass was mirror polished.

After preparing glasses by these methods, the glasses were reheated at their glass transition temperatures to reduce thermal strain.

[Electron Microscope Observation and Cracking Probability]

Glasses were prepared by heat treating or melting a mixed powder of the first and second glass powders under different conditions. The cracking load of each glass was obtained using the loads in the range of 0.098 to 490 N.

Figure 10:
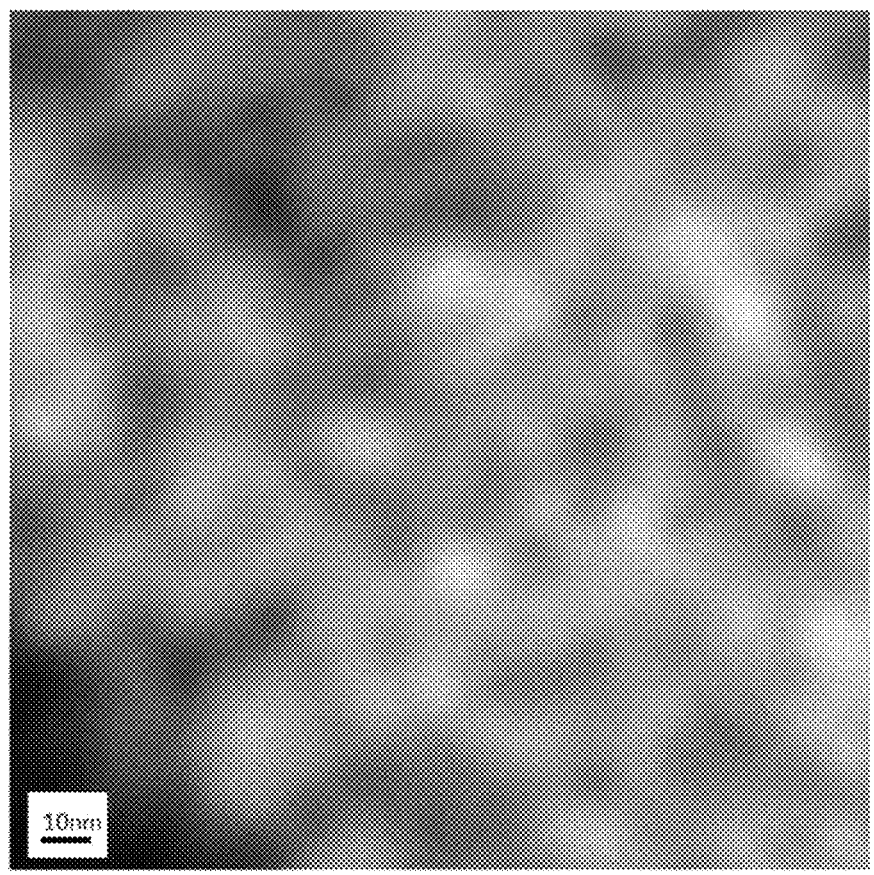
FIG. 10 shows a scanning transmission electron microscope image showing that a high density glass portion and a low density glass portion remain in a glass (present invention) obtained by mixing raw materials (g), (e') at (g):(e')=7:3 and heat treating the mixed powder at a low temperature under pressure.
Figure 11:
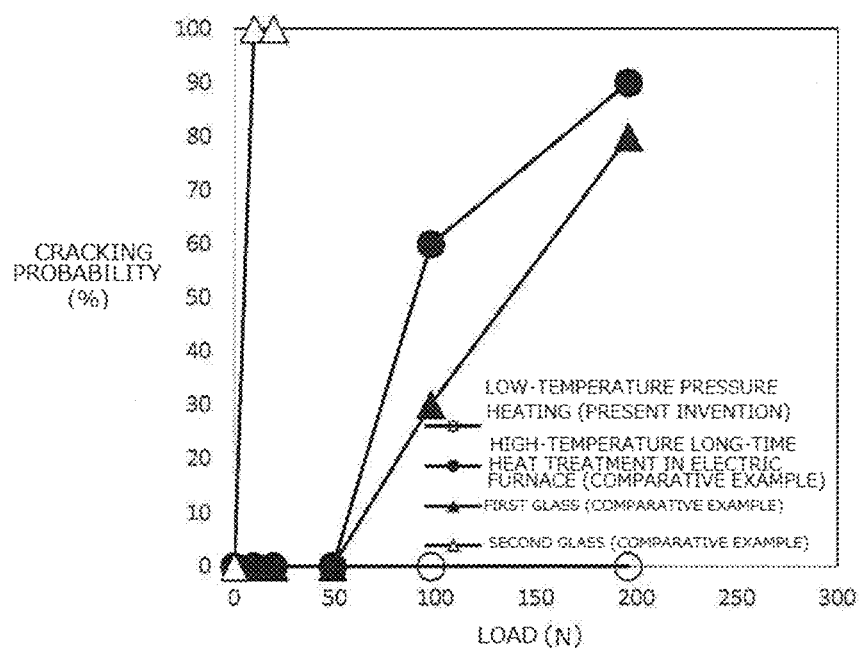
FIG. 11 is a diagram showing cracking probabilities of a glass (present invention) obtained by mixing the raw materials (g), (e') at (g):(e')=7:3 and heat treating the mixed powder at a low temperature under pressure and a glass obtained by heat treating the mixed powder at a high temperature.

D) Results Shown in FIGS. 10 and 11

Amorphous $SiO_2$ (particle size: 1 μm) was used as the second glass powder (high RID), and a solution method was used as a method for producing a precursor of a $B_2O_3$ glass that is the first glass powder (low RID). 1 mol/L of hydrochloric acid was dropped into a solution of tributyl boron in ethanol until pH is 2, and the resultant solution was stirred at 70° C. on a hot plate. Thereafter, (b') amorphous $SiO_2$ glass powder (particle size: 20 to 30 nm) that is the second glass powder was added to this solution so that the composition ratio is $70B_2O_3$-$30SiO_2$ (mol %). The resultant solution was heated in an oven at 70° C. until solidified, and then heated in an electronic furnace at 200° C. for one hour to obtain a mixed powder. As the solvent evaporates, $B_2O_3$ precipitates, and a mixed powder of the first and second glass powders is obtained.

The following two heat treatment conditions were used for the mixed powder.

(Symbol ○) Heat treating the mixed power at 350° C. while pressing at a load of 1 MPa (Symbol ●) Hold the mixed powder in an electric furnace at 1400° C. for one hour to melt the mixed power and then cool the resultant melted glass When looking at FIG. 10 showing a high-angle annular dark field scanning transmission electron microscope (STEM-HAADF) image of a sample prepared by heat treating the mixture at a temperature lower than the glass transition temperature (1080° C.) of the second glass while pressing, there are darker and lighter contrast portions of 10 to 20 nanometers in size. In STEM-HAADF, elements with larger atomic numbers appear in whiter contrast. Accordingly, the white portions are regions containing a large amount of $SiO_2$, and the dark portions are regions containing a large amount of $B_2O_3$. It is observed that the glass portions of 10 to 20 nanometers in size containing a large amount of $SiO_2$ are dispersed with the composition changing gently and continuously with no clear interfaces. Since the composition changes continuously, the size of each glass portion was measured as the size of the point with an intermediate brightness (intermediate composition) in the glass portion.

According to the results of crack probabilities shown in FIG. 11, the glass (○) obtained by heat treating the mixed powder at 350° C. under load has a lower cracking probability than the homogeneous glass (●) obtained by melting the mixed powder in an electric furnace at 1400° C. and then cooling the resultant melted glass. The melting temperature of the latter is sufficiently higher than the glass transition temperature of the raw material of the first glass and the glass transition temperature of the raw material of the second glass, and homogenization proceeded sufficiently.

That is, heat treating the mixed powder at a temperature lower than the glass transition temperature of one glass (second glass) while pressing effectively reduces diffusion, and the resultant glass exhibits high crack resistance due to the presence of the first glass portion and the second glass portion.

EXAMPLE 3

[Sample Preparation]

In order to prepare two types of glass composites different in ion packing density (recovery of indentation depth RID), one glass that is porous was impregnated with a precursor solution of the other glass.

A glass with the following composition has an ion packing density of 0.47 or less (RID of 0.38 or more).

e') Porous Glass of $97SiO_2$-$3(Al_2O_3, Na_2O, B_2O_3)$ (mol %)

This glass was obtained by heat treating a glass with a composition of $7.7Na_2O$-$4.0CaO$-$2.7Al_2O_3$-$33.0B_2O_3$-$52.0SiO_2$ (mol %) at 600° C. for 48 hours and then acid treating the heat treated glass with $1N$—$HNO_3$ in an autoclave at 120° C. for 48 hours. The heat treatment causes spinodal phase separation into the porous glass of $97SiO_2$-$3(Al_2O_3, Na_2O, B_2O_3)$ (mol %) (first glass) and the residue $16.2Na_2O$-$8.4CaO$-$5.7Al_2O_3$-$69.6B_2O_3$ (mol %) with clear interfaces therebetween, and the acid treatment of the spinodal phase-separated glass causes dissolution of $16.2Na_2O$-$8.4CaO$-$5.7Al_2O_3$-$69.6B_2O_3$ (mol %). The first glass is thus obtained. The pore size was obtained by nitrogen gas adsorption, and the results showed that 45 vol % of the total volume was pores and the average pore size was 4 nm. These pores of the glass were filled with a $B_2O_3$ glass with an ion packing density of 0.55 or more (RID being 0.32 or less). As a result, the first glass one-dimensionally connected to the second glass is precipitated. Diffusion proceeds by the subsequent heat treatment, so that the composition change near the interfaces between the glass portions becomes gentle.

A glass was obtained by placing the porous glass in a solution of $B_2O_3$ in ethanol, leaving the porous glass in the solution at 40° C. for one day, drying the porous glass, and heat treating the dried glass at 350° C. Since the heat treatment temperature is higher than the glass transition temperature (260° C.) of (g) $B_2O_3$ that is the first glass and lower than the glass transition temperature (890° C.) of the second glass (e'), diffusion is effectively reduced, so that the glass portions remain in the resultant glass.

[Electron Microscope Observation and Cracking Probability]

Figure 12:
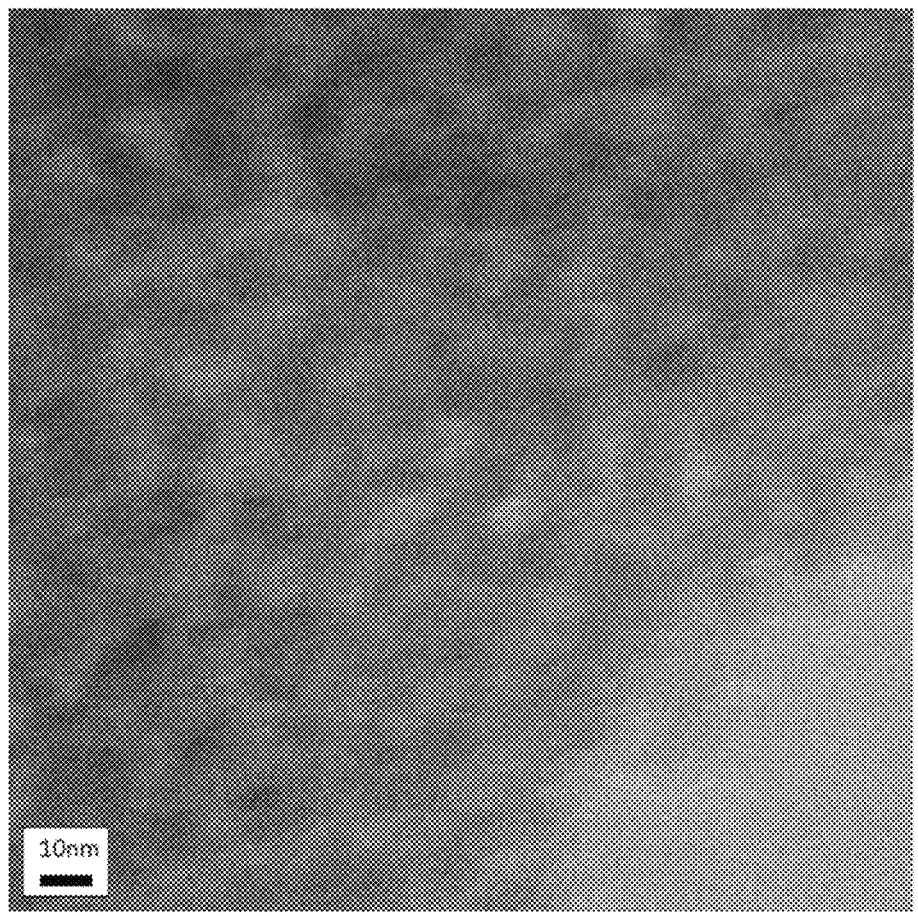
FIG. 12 shows a scanning transmission electron microscope image showing that a high density glass portion and a low density glass portion remain in a glass (present invention) obtained by impregnating a porous (e') glass with a (g) glass precursor solution and then heat treating the impregnated porous glass at a low temperature.

When looking at FIG. 12 showing a high-angle annular dark field scanning transmission electron microscope (STEM-HAADF) image of the sample prepared by impregnating the porous glass with the $B_2O_3$ solution and then heat treating the porous glass at 350° C., there are darker and lighter contrast portions of 4 nanometers in size. In STEM-HAADF, elements with larger atomic numbers appear in whiter contrast. Accordingly, the white portions are regions containing a large amount of $SiO_2$, and the dark portions are regions containing a large amount of $B_2O_3$. It is observed that the glass portions of 4 nanometers in diameter containing a large amount of $B_2O_3$ are connected one-dimensionally and dispersed with the composition changing gently and continuously with no clear interfaces. Since the composition changes continuously, the size of each glass portion was measured as the size of the point with an intermediate brightness (intermediate composition) in the glass portion.

This glass was further heat treated at 1400° C. This temperature is higher than the glass transition temperature of the raw material of the first glass and the glass transition temperature of the raw material of the second glass, and homogenization proceeded sufficiently. The cracking loads of these glasses and their precursor glasses were obtained using the loads in the range of 0.098 to 490 N.

(Symbol ◯) Heat treating the glass at 350° C. for 5 minutes (present invention)

(Symbol ●) Hold the glass in an electric furnace at 1400° C. for one hour to melt the glass and then cool the melted glass (comparative example)

(Symbol △) Dense glass of $97SiO_2$-$3(Al_2O_3, Na_2O, B_2O_3)$ (mol %) (first glass) (comparative example). This glass was obtained by heat treating the porous glass at 1200° C. for one hour.

(Symbol ▲) $B_2O_3$ glass (second glass) (comparative example)

(Symbol ■) $7.7Na_2O$-$4.0CaO$-$2.7Al_2O_3$-$33.0B_2O_3$-$52.0SiO_2$ (mol %) glass (comparative example)

Figure 13:
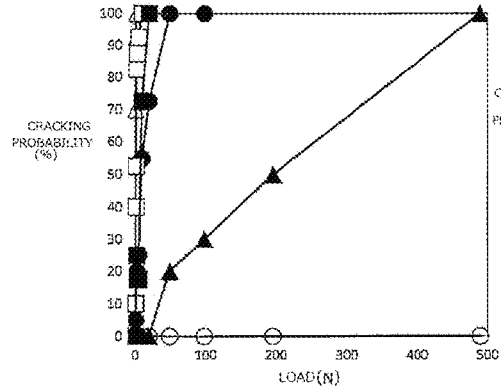
FIG. 13 shows diagrams showing cracking probabilities of a glass (present invention) obtained by impregnating a porous (e') glass with a (g) glass precursor solution and then heat treating the impregnated porous glass at a low temperature, a glass obtained by heat treating the impregnated porous glass at a high temperature, a (g) glass, a (d') glass, a glass synthesized as a precursor of the porous glass, and a phase-separated glass obtained by heat treating the glass synthesized as a precursor of the porous glass in an electric furnace. The abscissa of the diagram on the left is enlarged in the diagram on the right.
Figure 13:
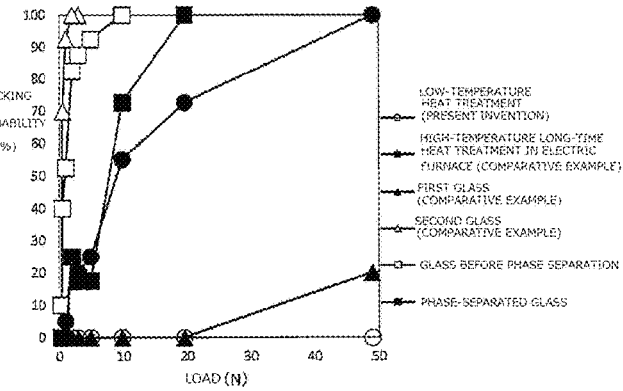

(Symbol □) Phase-separated glass obtained by heat treating the $7.7Na_2O$-$4.0CaO$-$2.7Al_2O_3$-$33.0B_2O_3$-$52.0SiO_2$ (mol %) glass at 600° C. for 48 hours According to the results of crack probabilities shown in FIG. 13, the glass (◯) obtained by heat treatment at 350° C. has a lower cracking probability than the glass (●) obtained by melting the glass in an electric furnace at 1400° C. and then cooling the resultant melted glass. That is, heat treatment at a temperature lower than the glass transition temperature of one glass (second glass) effectively reduces diffusion, and the resultant glass exhibits high crack resistance due to the presence of the first glass portion and the second glass portion. Comparison between (■) and (□) shows that no significant increase in cracking load is caused by phase separation, but there is a significant increase in cracking load in the glass according to the present invention. This shows that the heat treatment at a temperature lower than the glass transition temperature of one (second glass) has a significant effect on crack resistance.

EXAMPLE 4

Sample Preparation

In order to prepare two types of glass composites different in ion packing density (recovery of indentation depth RID), one glass that is a surface porous glass was impregnated with a precursor solution of the other glass.

Figure 14:
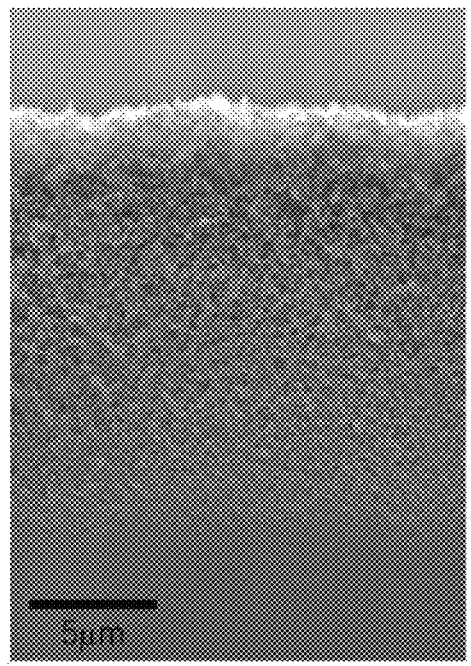
FIG. 14 shows a scanning transmission electron microscope image of an (f') glass obtained by making a (c') glass porous by treating the (c') glass with a $NaHCO_3$ solution, showing that a region with a depth of 15 μm from the surface is porous.

A glass with the following composition has an ion packing density of 0.47 or less (RID of 0.38 or more).

c') Glass Obtained by Making the Surface of $81SiO_2$-$13B_2O_3$-$2Al_2O_3$-$3Na_2O$-$1K_2O$ (mol %) Porous This glass is a first glass shown in FIG. 14 whose region with a depth of 15 μm from a first surface was made porous by placing a glass with a composition of (c') $81SiO_2$-$13B_2O_3$-$2Al_2O_3$-$3Na_2O$-$1K_2O$ (mol %) in a 0.5M-$NaHCO_3$ aqueous solution and acid treating the glass in an autoclave at 120° C. for 24 hours. Using pores of this glass as a template, a $B_2O_3$ glass with an ion packing density of 0.55 or more (RID being 0.32 or less) was precipitated to fill the pores. As a result, the first glass vitrified in the second glass is precipitated. Diffusion proceeds by the subsequent heat treatment, so that the composition near the interfaces between the glass portions becomes gentle.

A glass was obtained by placing the porous glass in a solution of $B_2O_3$ in ethanol, leaving the porous glass in the solution at 40° C. for one day, drying the porous glass, and heat treating the dried glass at 350° C. Since the heat treatment temperature is higher than the glass transition temperature (260° C.) of (g) $B_2O_3$ that is the first glass and lower than the glass transition temperature (525° C.) of the second glass (e'), diffusion is effectively reduced, so that the glass portions remain in the resultant glass.

[Cracking Probability]

(Symbol ◯) Glass obtained by heat treatment at 350° C. for 5 minutes (present invention)

(Symbol ●) Dense glass of $81SiO_2$-$13B_2O_3$-$2Al_2O_3$-$3Na_2O$-$1K_2O$ (mol %) (first glass) (Comparative Example 1)

(Symbol △) Surface porous glass of $81SiO_2$-$13B_2O_3$-$2Al_2O_3$-$3Na_2O$-$1K_2O$ (mol %) (Comparative Example 2)

Figure 15:
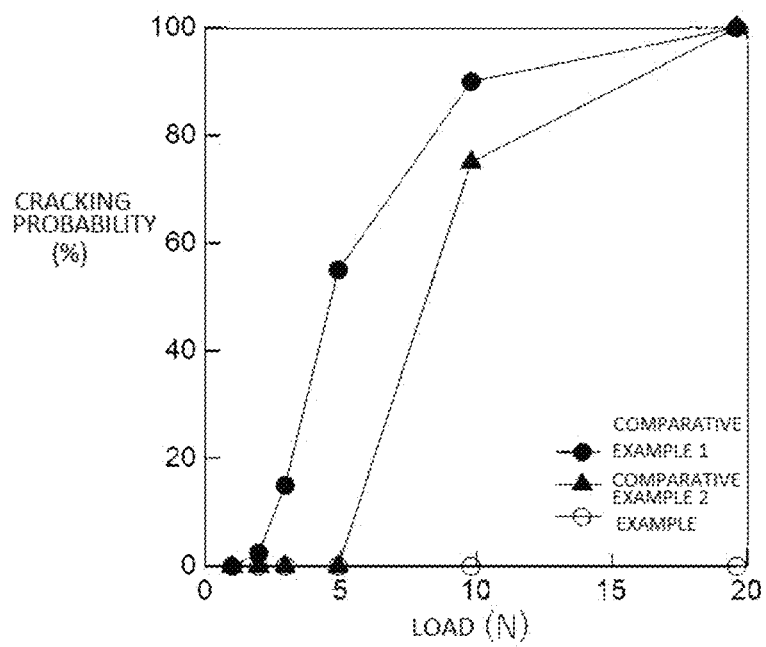
FIG. 15 is a diagram showing cracking probabilities of a glass (present invention) obtained by impregnating a porous (f') glass with a (g) glass precursor solution and then heat treating the impregnated porous glass at a low temperature, a (f') glass, and a (c') glass.

According to the results of cracking probabilities shown in FIG. 15, the glass (◯) obtained by impregnation with the $B_2O_3$ solution and heat treatment at 350° C. has a lower cracking probability than the first glass (●). That is, heat treatment at a temperature lower than the glass transition temperature of one glass (second glass) effectively reduces diffusion, and the resultant glass exhibits high crack resistance due to the presence of the first glass portion and the second glass portion. The glass (◯) obtained by impregnation with the $B_2O_3$ solution and heat treatment at 350° C. also has a lower cracking probability than the surface porous glass (△). That is, not the effect of the surface porosity itself but diffusion of the second glass effectively reduces the cracking probability. There is a significant increase in cracking load in the glass according to the present invention. This shows that even though the glass remains porous inside, forming the structure of the present invention only in a region near the surface also has an effect on crack resistance.

In the embodiment of the present invention, the condition for heat treating the mixture of the first and second glass powders in the above Examples 1 to 4 constitutes the "condition that causes the first glass portion and the second glass portion to remain in the resultant glass" or the "condition that causes the dominance of the plastic flow characteristic in the first glass portion and the dominance of the densification characteristic in the second glass portion to remain in the resultant glass."

Although the embodiment of the invention are described above with reference to the drawings, the present invention is not limited to the illustrated embodiment, and various changes and additions can be made within the scope identical or equivalent to that of the present invention.

INDUSTRIAL APPLICABILITY

The glass according to the present invention has high crack resistance and is hard to break, and therefore can be advantageously used for various applications. For example, the glass according to the present invention can be advantageously used for glass sealing members, glass containers, glass covers for device surfaces, etc.

The invention claimed is:
1. A glass, comprising:
a first glass portion; and
a second glass portion,
wherein
the first glass portion has a composition that forms a glass having a property that, out of plastic deformation characteristics, plastic flow is more dominant than in the second glass portion,
the second glass portion has a composition that forms a glass having a property that, out of the plastic deformation characteristics, densification is more dominant than in the first glass portion,
the first glass portion includes a first glass region having a glass composition with an ion packing density of 0.55 or more, and
the second glass portion includes a second glass region having a glass composition with an ion packing density of 0.47 or less.
2. The glass according to claim 1, wherein
there is no clear boundary between the first glass portion and the second glass portion, and a change in the property from the first glass portion to the second glass portion is continuous and smooth.
3. The glass according to claim 1, wherein the first glass portion or the second glass portion is 1 μm or less in size.
4. The glass according to claim 1, wherein
in indentation depth measurement using indentation with a Vickers indenter, recovery of indentation depth of the glass having the composition that forms the first glass portion is lower than recovery of indentation depth of the glass having the composition that forms the second glass portion, the recovery of indentation depth RID being given by (Db−Da)/Db, where Db represents an indentation depth before heat treatment at a glass transition temperature, and Da represents an indentation depth after the heat treatment at the glass transition temperature.
5. The glass according to claim 4, wherein
the recovery of indentation depth of the first glass region is less than 0.35, and the recovery of indentation depth of the second glass region is 0.35 or more.
6. The glass according to claim 1, wherein
the ion packing density of the glass composition in the first glass portion is higher than the ion packing density of the glass composition in the second glass portion.
7. The glass according to claim 1, wherein
a glass transition temperature of the glass composition of the first glass portion is lower than a glass transition temperature of the glass composition of the second glass portion.

8. The glass according to claim 7, wherein
the first glass portion includes transition metal ions or rare earth ions and has light absorption by the transition metal ions or the rare earth ions in a near-infrared region.
9. A glass sealing member comprising the glass according to claim 1.
10. A glass container comprising the glass according to claim 1.
11. A glass cover for a device surface, comprising the glass according to claim 1.
12. A method for manufacturing a glass according to claim 1, the method comprising the steps of:
preparing a precursor of the first glass portion in which, out of the plastic flow characteristic and the densification characteristic that are plastic deformation characteristics, the plastic flow characteristic is dominant;
preparing a precursor of the second glass portion in which the densification characteristic is dominant;
mixing the precursor of the first glass portion and the precursor of the second glass portion to obtain a mixture; and
heat treating the mixture under a condition that the first and second glass portions remain in the glass.
13. The method for manufacturing a glass according to claim 12, wherein
the heat treatment of the mixture is performed under a condition that the first and second glass portions remain with a continuous change in compositions of the first and second glass portions in the glass after the heat treatment.
14. The method for manufacturing a glass according claim 12, wherein
the precursor of the first glass portion and the precursor of the second glass portion are mixed so that either the precursor of the first glass portion or the precursor of the second glass portion has a particle size of 1 μm or less.
15. The method for manufacturing a glass according to claim 12, wherein
the precursor of the first glass portion has a first glass transition temperature,
the precursor of the second glass portion has a second glass transition temperature that is higher than the first glass transition temperature, and
the mixture is heat treated at a temperature equal to or higher than the first glass transition temperature and equal to or lower than the second glass transition temperature.
16. The method for manufacturing a glass according to claim 12, wherein
the mixture is heat treated by infrared radiation.
17. A glass, comprising:
a first glass portion; and
a second glass portion,
wherein
the first glass portion has a composition that forms a glass having a property that, out of plastic deformation characteristics, plastic flow is more dominant than in the second glass portion,
the second glass portion has a composition that forms a glass having a property that, out of the plastic deformation characteristics, densification is more dominant than in the first glass portion,
in indentation depth measurement using indentation with a Vickers indenter, recovery of indentation depth of the glass having the composition that forms the first glass portion is lower than recovery of indentation depth of the glass having the composition that forms the second glass portion, the recovery of indentation depth RID being given by (Db−Da)/Db, where Db represents an indentation depth before heat treatment at a glass transition temperature, and Da represents an indentation depth after the heat treatment at the glass transition temperature, the first glass portion includes a first glass region having a first glass composition with the recovery of indentation depth of less than 0.35, and the second glass portion includes a second glass region having a second glass composition with the recovery of indentation depth of 0.35 or more.

18. The glass according to claim 17, wherein
there is no clear boundary between the first glass portion and the second glass portion, and a change in the property from the first glass portion to the second glass portion is continuous and smooth.

19. The glass according to claim 17, wherein
a glass transition temperature of the glass composition of the first glass portion is lower than a glass transition temperature of the glass composition of the second glass portion.

20. A method for manufacturing a glass according to claim 17, the method comprising the steps of:
preparing a precursor of the first glass portion in which, out of the plastic flow characteristic and the densification characteristic that are plastic deformation characteristics, the plastic flow characteristic is dominant;
preparing a precursor of the second glass portion in which the densification characteristic is dominant;
mixing the precursor of the first glass portion and the precursor of the second glass portion to obtain a mixture; and
heat treating the mixture under a condition that the first and second glass portions remain in the glass.

* * * * *